Dec. 2, 1969   E. A. MEYER   3,481,096
SIDE-LOADED WHEEL OPENING CLIP
Original Filed Sept. 7, 1966
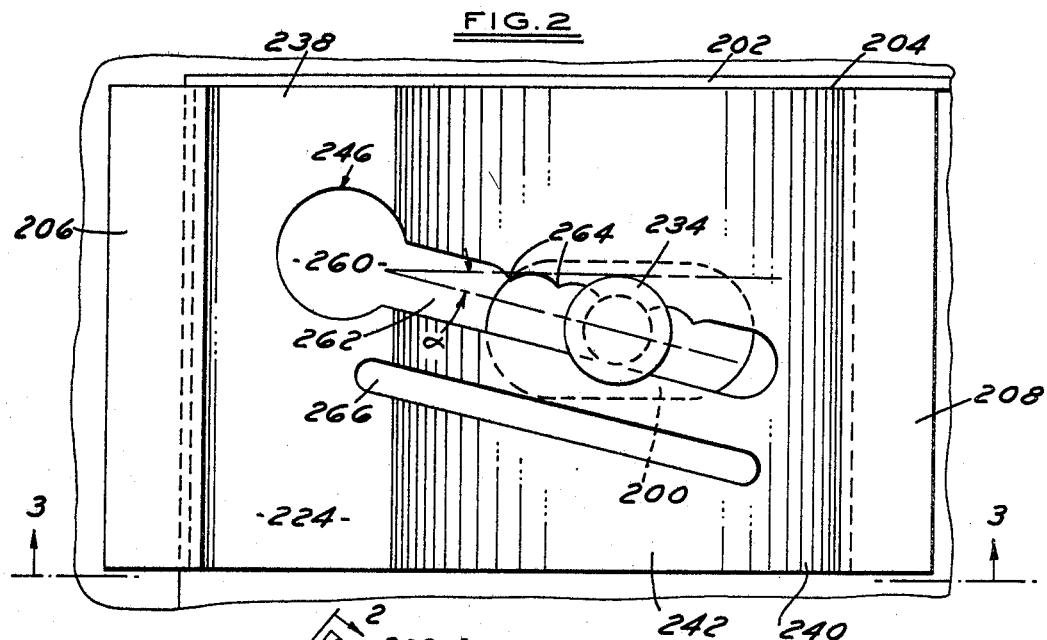
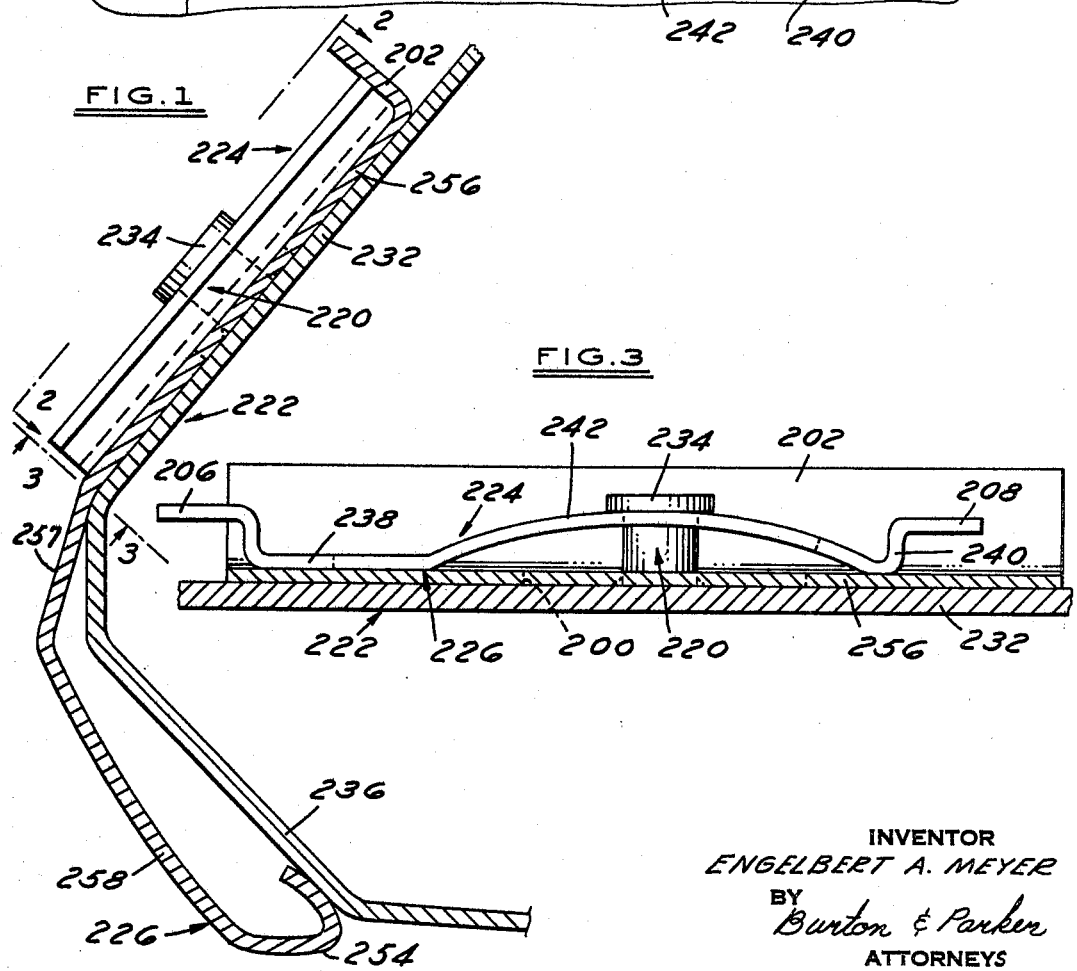
INVENTOR
ENGELBERT A. MEYER
BY
Burton & Parker
ATTORNEYS

United States Patent Office 3,481,096
Patented Dec. 2, 1969

3,481,096
SIDE-LOADED WHEEL OPENING CLIP
Engelbert A. Meyer, Union Lake, Mich., assignor to Warren Fastener Corporation, Mount Clemens, Mich., a corporation of Michigan
Original application Sept. 7, 1966, Ser. No. 577,713. Divided and this application July 18, 1968, Ser. No. 745,805
Int. Cl. E04f 19/02; A44b 17/00
U.S. Cl. 52—718                                    10 Claims

ABSTRACT OF THE DISCLOSURE

This disclosure relates to a structural assembly, including a structural member having a stud or button extending therefrom, and a clip overlying the structural member including an elongated stud receiving slot. The stud receiving slot is defined at an acute angle to one of the marginal edges of the clip, such that the clip is shifted laterally into tensioned abutting engagement with an opposed surface of the structural member as the clip is seated on the button. In the disclosed embodiment, the structural member is a molding or trim piece.

RELATED APPLICATION

This application for patent is a division of my co-pending application for United States Letters Patent, Ser. No. 577,713, now U.S. Patent No. 3,410,045.

FIELD OF THE INVENTION

The structural assembly of this invention is particularly, although not exclusively, adapted to secure a panel or trim strip to a support, wherein a separate means is utilized to attach the trim to the substructure.

DESCRIPTION OF THE PRIOR ART

The teaching of the prior art has been discussed more fully in my above referenced co-pending application for patent, however the following references are cited herein as examples of molding fasteners, wherein the clip member rotates to engage and secure the molding: 2,605,-871, 2,930,459, 3,298,145.

SUMMARY OF THE INVENTION

The structural assembly of this invention includes a structural member, a stud or button extending from the plane of the structural member, and a clip overlying a structural member and secured to the stud. The clip has an elongated stud receiving slot which extends at an acute angle to a marginal edge of the clip which is initially spaced from an opposing surface of the structural member. When the clip is received on the stud, and shifted to receive the stud in the elongated slot, the aforesaid marginal edge of the clip is tensioned against the opposed surface of the structural member, thereby retaining the clip in position.

In the disclosed embodiment of the invention, the structural member is a molding or trim member, and the button is secured through an aperture in the trim member to a support, such as an automotive panel. The clip in this embodiment is also bowed relative to the plane of the support; thereby tensioning the trim member against the support, as the clip is tensioned against the opposed surface of the structural member. The opposed surface of the structural member is provided by an upstanding flange on the trim member. The trim member is received over a generally right angled surface of the support, thereby preventing movement of the trim member during securement of the clip. Other securement means may however be utilized as required by the specific application.

The marginal edge of the elongated button receiving slot may also be provided with teeth to prevent withdrawal of the clip from the stud, and prevent motion of the clip relative to the trim member under vibration or shock. In the disclosed embodiment of the invention, the teeth restrict the slot to a width less than the diameter or width of the button, and a second slot is provided in the clip to permit spreading of the slot to receive the button. The use and function of the second slot is described more fully in my above referenced co-pending application for patent. The second slot is preferably substantially parallel to the elongated button receiving slot to provide resiliency in the axis of the button receiving slot.

Molding devices are used in the manufacture of automobiles, refrigerator and appliance housings, and the like, to meet design and functional requirements. Previously used molding securement techniques required a hole in the support panel, and a bolt or clip assembly extended through the panel opening to secure the molding. More recently this method was replaced by the weld on fastener system, wherein relatively small headed buttons are secured to the panel, and a clip or adaptor is received on the button to secure the molding channel. Examples of the weld on fastener system may be found in my United States Letters Patent Numbers 3,239,988, 3,246,440, and Sweeney's United States Letters Patent No. 3,222,838.

Preferably, the button is attached to the support in accordance with the method described in United States Letters Patent 3,153,468, which is assigned to the assignee of the instant application, wherein the button is welded to steel or adhesively secured to various materials including steel, thereby eliminating the corrosion problems inherent in previously used techniques requiring a hole through the support. Another advantage is the substantial reduction in storage requirements made possible by the weld on system. Separate inventory of common body panels, and the like, necessitated by the use of different trim arrangements, have been eliminated because the buttons are welded on in the assembly line. A series of spaced buttons for a single longitudinal molding device may be applied in a gang operation with accurate alignment.

The button of the weld on system is small when compared to previously employed fasteners in the automotive field. A suitable size button, presently used in the mass production of automobiles, involves a button which is 0.200 inch in diameter at its head, 0.160 inch in height; the diameter of the shank being slightly greater than one half the diameter of the head.

Utilization of the weld on fastener system in the automotive field has provided substantial economies and advantages over previous methods. Similar usefulness and advantages may be obtained in other fields, such as appliances, refrigerators, stoves and the like. The instant application however will be described in the context of an automotive molding asembly. Other advantages and meritorious features will be more fully disclosed in the following description of the preferred embodiment, claims, and accompanying drawings, wherein:

BRIEF DESCRIPTION OF THE DRAWINGS

FIGURE 1 is a partially cross sectioned side elevation of one embodiment of the structural assembly of this invention, adapted to secure an automotive wheel opening molding;

FIGURE 2 is a top view of the molding assembly of FIGURE 1, in the direction of view arrows 2—2; and FIGURE 3 is a cross sectional view of the molding assembly shown in FIGURE 1, in the direction of view arrows 3—3.

DESCRIPTION OF THE PREFERRED EMBODIMENT

Referring to the embodiment of the structural assembly shown in the drawings, the molding assembly includes a button 220 secured to a support 222 such as an automotive body panel, a generally C-shaped molding 226 received directly over the support, and a clip 224 tensioned beneath the head portion of the button 234, and against the molding. In the embodiment of the molding assembly disclosed in my co-pending application for patent, the button and clip is concealed beneath the molding, however in this embodiment the clip is received over and is tensioned against the portion of the molding concealed within the automotive wheel opening. In the present embodiment, a series of spaced buttons are secured to the automotive body panel which extends into the wheel opening, and an equal number of clips are secured beneath the enlarged head of the buttons and secure the molding in place.

The support in this embodiment has a pair of angularly related portions 232 and 236 which define the corner of the automotive wheel opening. The molding has an aperture 200, which receives the button 220 therethrough, defined in a lateral wall portion 256 which closely overlies the inwardly extending body panel 232 of the wheel opening. The lateral wall 256 of the molding terminates in an upwardly extending flange 202, whose function is described hereinbelow. The opposed end 254 of the molding extends from within the wheel opening to overlie the exposed body panel 236, and to define a pair of angularly related wall portions 256 and 258 which complement and overlie the angularly related support surfaces 232 and 236, respectively, and a midportion 257 which overlies the junction of the support surface. The end 258 overhanging the outer wall of the wheel opening prevents lateral shifting of the molding 226 upon receipt of the clip 224, however other means preventing lateral shifting may also be utilized as described hereinbelow.

The molding clip of this embodiment has a pair of opposed ends 238 and 240 which are tensioned toward the support 222, beneath the button head 234, and a midportion 242 bowed from the plane of the ends to be tensioned beneath the button head. In this embodiment, the molding clip overlies the molding, and the opposed ends are spaced axially on one of the angularly related molding and support surfaces. The ends, 206 and 208, may be turned from the support, as shown, to prevent scratching of the molding member during assembly.

The clip is provided with a key hole slot 246, including an enlarged opening 260 which receives the button head 234 therethrough, and an elongated slot portion 262. The body portion of the clip adjacent the elongated slot portion defines a button seat, which is received beneath and tensioned against the underside of the enlarged button head. In this embodiment of the invention, the communication to the button seat is restricted by a series of teeth 264 which extend from the body portion of the clip into the key hole slot to inhibit withdrawal of a button from the button seat, and prevent relative motion between the clip and the molding under vibration or shock. In the preferred embodiment of the disclosed molding clip, the width of the elongated slot 262, at a tooth 264, is slightly less than the diameter of the button shank. A second slot 266 is therefore provided in the body portion of the clip to provide the required resiliency to allow a button to be seated in the slot portion past the teeth 264. The second slot 266 is preferably generally parallel to the elongated slot 262 to provide the requisite resiliency along the entire length of the button receiving slot.

The generally longitudinally extending slot portion 262 of the key hole slot 246, and therefore the generally parallel adjacent slot 266, is disposed at an acute angle α to the longitudinally extending lateral edge 204 of the clip, such that the lateral edge is tensioned against the upwardly extending lateral flange 202 of the molding as the clip is seated in the key hole slot. The linear portion 262 of the slot therefore cooperates with the stud or button 234 to shift the marginal or lateral edge 204 of the clip into abutting tensioned engagement with the upstanding surface of the flange 202 as the clip is shifted to seat the stud on the stud seat, and firmly locks the molding in position against withdrawal and the vibrational and shock forces encountered in automotive applications. The abutting tensioned engagement of the lateral edge 204 of the clip against the upwardly extending flange 202, cooperates with the teeth 264 in the elongated slot to provide an extremely secure assembly, however the teeth 264 may be eliminated in certain less severe applications. The bowed and angled portions of the clip also provide structural reinforcement, which may be supplemented by ribs or the like as shown by my above referenced co-pending application for patent.

This embodiment of the wheel opening molding is assembled by securing a plurality of spaced buttons within the wheel opening. The apertures 200 in the molding are then disposed over the buttons and the molding is held in place. Next a series of clips are secured over the molding by disposing the enlarged opening 260 of the key hole slot over a button head 234, and shifting the clip axially to seat the button in the slot portion 262 beyond one or more of the teeth 264. The adjacent slot 266 provides the resiliency in the clip required to seat the button in the slot portion, as described above, and the relative angle of the slot tensions the lateral edge 204 of the clip against the flange 202 as the clip is shifted into position. The clip and button are thus concealed within the wheel opening, but are easily accessible for subsequent removal.

Various materials may be used for all parts of the molding assembly, however the automotive industry utilizes metal primarily for the automotive support, the button, the molding clip, and the molding device. Steel is used primarily for the molding support, with stainless steel being used for the button, as well as cold rolled zinc plated steel. The molding clip may be fabricated from sheet metal stock in a continuous die operation. The buttons are stud welded to a prefabricated automotive support, before painting, or at least before final finishing, in a predetermined orientation. After cleaning, coating, and polishing, the automotive support is ready to receive the molding assembly.

While the molding assembly, clip and button have been described with reference to certain embodiments and arrangement of elements, it is understood by those skilled in the art that various modifications may be made to the embodiments disclosed without departing from the purview of the appended claims or the invention as disclosed herein. For example, the structural assembly disclosed hereinabove could be utilized to secure a molding or other structural member adjacent a surface or flange of a rigid member. The overhanging portion 258 of the molding could thus be eliminated. In such embodiment, the button or stud 220 may be secured directly to the structural member or molding 226. The term structural member is used herein to identify the member having the flange or angularly related surface 202, and is not limited to molding devices, as already stated hereinabove. Alternatively, the molding could be secured against movement on the shank of the button. The clip could thus be utilized to secure a variety of structural members, including a concealing molding or various structural panel members.

What is claimed is:

1. A structural assembly, comprising: a structural member having a generally planar surface and an angularly related upstanding surface, a stud extending from said planar surface of the structural member spaced from said upstanding surface, and a clip including a longitudinally extending marginal edge adapted to abut said upstanding surface and an elongated slot spaced from said edge receiving said stud, said slot including a generally longitudinally extending portion disposed at an acute angle to said marginal edge of the clip and having a stud receiving opening and a stud seat spaced farther from said marginal edge than said opening, said linear portion of the elongated slot cooperating with said stud to shift said marginal edge of the clip laterally into abutting tensioned engagement with said upstanding surface of the structural member as the clip is shifted to seat the stud on said stud seat from said opening.

2. The structural assembly defined in claim 1, characterized in that said upstanding surface of the structural member is an upstanding flange generally perpendicular to the plane of said structural member in tensioned abutting engagement with said marginal edge of the clip.

3. The structural assembly defined in claim 1, characterized in that said clip includes a second slot adjacent said elongated slot, permitting lateral flexing of the marginal edges of said stud receiving slot as the stud is received therein.

4. The structural assembly defined in claim 3, characterized in that the marginal edge of said elongated stud receiving slot includes a plurality of teeth restricting the slot to a width less than the width of the stud, and said second slot provides the requisite resiliency in said clip to permit said stud to be seated beyond said teeth.

5. The structural assembly defined in claim 4, characterized in that said second slot is substantially parallel to said elongated slot.

6. A structural assembly, comprising: a support having a button secured thereto, a structural member overlying said support having an angularly related upstanding surface spaced from said button, and a clip received over said structure member securing said structural member to the support, said clip having a longitudinally extending marginal edge portion adapted to abut said upstanding surface and an elongated slot spaced from said edge receiving said button including a generally longitudinally extending portion defined at an acute angle to said marginal edge of the clip, the linear portion of said slot having a stud receiving opening and a button seat spaced farther from said marginal edge of the clip than said opening, said linear portion of the slot and said button cooperating to shift said marginal edge of the clip laterally into abutting engagement with said upstanding surface of the structural member as the clip is shifted to seat the button on said button seat from said opening, and a means preventing lateral shifting of the structural member as the marginal edge of the clip is tensioned against said upstanding surface.

7. The structural assembly defined in claim 6, characterized in that said structural member includes a generally right angled portion received over a complementary angled portion of the support thereby preventing lateral motion of the structural member.

8. The structural assembly defined in claim 6, characterized in that said upstanding surface of the structural member is an upstanding flange generally perpendicular to the plane of the support in tensioned abutting engagement with said marginal edge of the clip.

9. The structural assembly defined in claim 6, characterized in that the body portion of said clip which includes said elongated slot is bowed from the plane of said structural member, thereby tensioning the overlying body portion of the clip against the structural member as the marginal edge of the clip is tensioned against the abutting surface of said structural member.

10. The structural assembly defined in claim 6, characterized in that said clip includes a second slot substantially parallel to said elongated button receiving slot, and the marginal edge of said button receiving slot includes a plurality of teeth restricting the slot to a width less than the width of said button, said second slot providing the resiliency in said clip required to allow said button to be seated in said slot beyond said teeth.

References Cited

UNITED STATES PATENTS

| | | | |
|---|---|---|---|
| 415,711 | 11/1889 | Galbreath et al. | 85—8.8 |
| 2,010,412 | 8/1935 | Parsons | 52—467 |
| 2,281,999 | 5/1942 | Rieback | 24—222 |
| 3,354,597 | 11/1967 | Meyer | 52—718 |
| 3,373,539 | 3/1968 | Meyer | 52—718 |

FOREIGN PATENTS

| | | |
|---|---|---|
| 1,156,422 | 12/1957 | France. |
| 66,127 | 4/1943 | Norway. |

FRANK L. ABBOTT, Primary Examiner

JAMES L. RIDGILL, Jr., Assistant Examiner

U.S. Cl. X.R.

24—211, 224